United States Patent [19]

Moyer

[11] 4,347,893
[45] Sep. 7, 1982

[54] OIL HEATED MOTORCYCLE HANDLEBAR CONSTRUCTION

[76] Inventor: Donald Moyer, 8105 Millcreek Pkwy., Levittown, Pa. 19054

[21] Appl. No.: 251,583

[22] Filed: Apr. 6, 1981

[51] Int. Cl.³ ............................................. B60H 1/14
[52] U.S. Cl. .................................... 165/44; 180/219; 74/551.8
[58] Field of Search ............................ 165/44, 41, 51; 180/68 R, 219; 74/551.1, 556.1, 551.8; 237/12.3 B, 12.3 A, 12.3 R; 123/41.33, 196 AB

[56] References Cited

U.S. PATENT DOCUMENTS

| 570,441 | 10/1896 | Pennington | 180/225 |
|---|---|---|---|
| 1,156,637 | 10/1915 | Shultz . | |
| 1,237,231 | 8/1917 | Wilson et al. . | |
| 1,262,392 | 4/1918 | Saint Clair . | |
| 1,983,907 | 12/1934 | Lindner . | |
| 2,354,345 | 7/1944 | Wintergreen . | |
| 2,662,961 | 12/1953 | Sargent | 74/552 |
| 2,781,859 | 2/1957 | Warren | 123/196 AB |
| 3,667,315 | 6/1972 | Polly, Sr. | 74/551.8 |
| 4,016,945 | 4/1977 | Shibata | 180/68 R |
| 4,258,676 | 3/1881 | Lamm | 123/196 AB |

FOREIGN PATENT DOCUMENTS

| 569188 | 10/1931 | Fed. Rep. of Germany | 180/225 |
|---|---|---|---|
| 72673 | 7/1929 | Sweden | 74/551.9 |
| 141622 | 4/1920 | United Kingdom | 123/196 AB |

*Primary Examiner*—William R. Cline
*Assistant Examiner*—Donald A. Kearney
*Attorney, Agent, or Firm*—John J. Kane; Frederick A. Zoda; Albert Sperry

[57] ABSTRACT

An oil heated motorcycle handlebar construction is enclosed utilizing an oil line extending from the engine or oil pump of the motorcycle engine to carry the warm oil to a sealed conduit defined along the interior of the handlebars. The intake line extends from the point of entry into the handlebars to the outermost end of one handle. An exit line is included extending from the outermost end of the opposite handle to carry the oil from the handlebar interior back to the oil tank of the conventional motorcycle engine. The intake line and the oil line include an intermediate aperture in order to minimize the heating of the portions of the handlebars adjacent to the gripping sections during operation of the motorcycle during the warmer months. Access to the interior of the oil chamber defined within the handlebars is provided by removable stoppers in the outer ends of each of the arms of the handlebar.

10 Claims, 4 Drawing Figures

U.S. Patent      Sep. 7, 1982      4,347,893
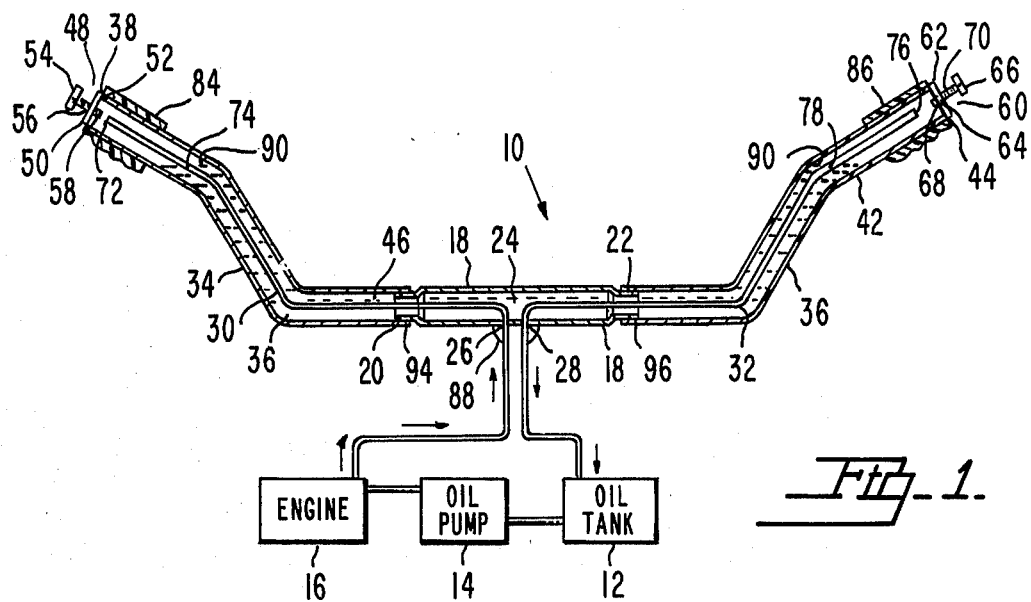
*Fig_1.*
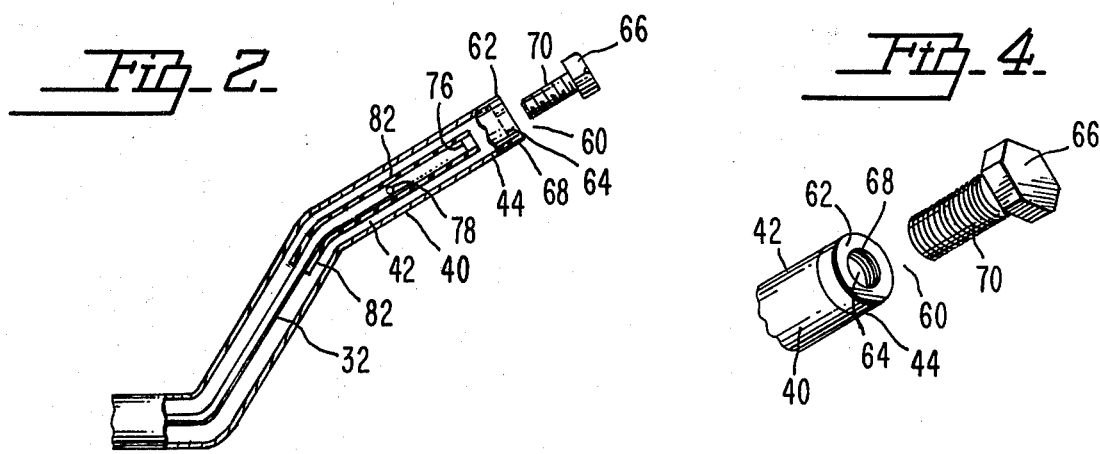
*Fig_2.*     *Fig_4.*
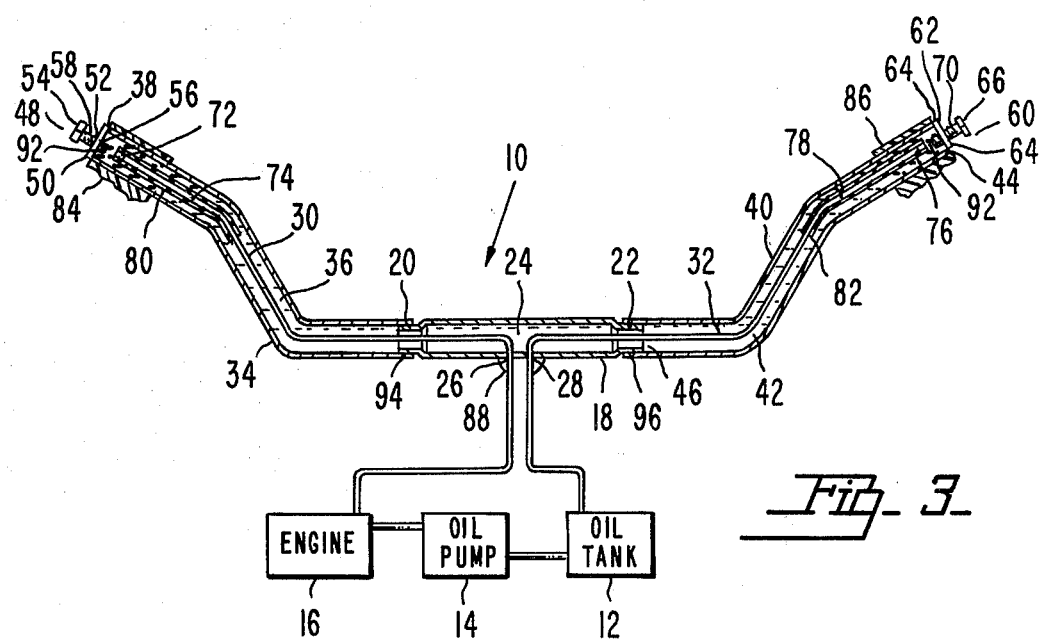
*Fig_3.*

OIL HEATED MOTORCYCLE HANDLEBAR CONSTRUCTION

BACKGROUND OF THE INVENTION

1. Field of the Invention

The present invention deals with the field of devices usable for providing comfort to operators of motorcycles during times of cold environmental conditions. It has been known that the hands of the motorcycle operator get cold during operation of the motorcycle whenever the temperature is at all cool.

2. Description of the Prior Art

Devices had been patented on various types of configurations for the heating of steering wheels or handlebars of motor vehicles in manners distinct structurally from the present design. Such examples of these configurations are shown in U.S. Pat. Nos. 570,441; 1,156,637; 1,237,231; 1,262,392; 1,983,907; and 2,354,345. Many of these devices utilize water as the heating fluid or other types of heating arrangements. However, none utilize the actual oil of the engine nor do they utilize the particular tubing configuration of the design of the present concept as claimed herein.

SUMMARY OF THE INVENTION

The present invention provides an oil heated motorcycle handlebar construction wherein the handlebar configuration includes a central handlebar section which extends generally horizontally. This handlebar section is adapted to be secured to the frame of the conventional motorcycle in such a manner that a first arm means may be secured at one end to the central section and a second arm means may be secured at the other end and provide the overall handlebar configuration.

The central section preferably defines a central conduit extending therethrough and also defines an oil intake hole and an oil exit hole in the walls thereof. The first arm means is secured to the central handlebar section at the first end of the central section and a second end of the central section is adapted to be secured to the second arm means. The first arm means will extend upwardly and outwardly from the first end of the central handlebar section and will define a first arm conduit therethrough which is in fluid flow communication with the central conduit. The outermost portion of the first arm is defined as the outer first arm end.

The second arm means is adapted to be secured extending upwardly and outwardly from the second end of the central handlebar section and to define a second arm conduit extending therethrough being in fluid flow communication with respect to the central conduit. The outermost end of the second arm means is defined as the outer second arm end. With this overall configuration the central conduit in cooperation with the first arm conduit and the second arm conduit all being in fluid flow communication will define an oil chamber for holding oil therein for heating of the motorcycle handlebar.

In order to effectively seal the outer first arm end of the first arm means a first stopper means is positioned therein to prevent fluid flow communication between the external environment and the oil chamber. Similarly a second stopper means is detachably secured to the second arm end to seal the second arm conduit from fluid flow communication with respect to the external environment and thereby isolate the oil chamber.

An intake line is connected from an oil pump or engine of the motorcycle and is adapted to admit warm oil into the oil chamber. This intake line means preferably extends through the oil intake hole into the central conduit and through the first end into the first arm conduit. It then extends upwardly to a location adjacent to the outer first arm end and defines an upper intake aperture at that location. The intake line means also defines a lower intake aperture within the first arm conduit at an intermediate location between the first end of the central section and the upper intake aperture.

An exit line means is positioned to withdraw warm oil from the oil chamber. This exit line shall extend through the oil exit hole into the central conduit and through the second end into the second arm conduit to a location adjacent to the outer second arm end. At this point it will define an upper exit aperture. The exit line means also defines a lower exit aperture within the second arm conduit at an intermediate location between the second end of the central section and the upper exit aperture.

A first tubing means preferably of rubber is selectively placeable over the end of the intake line means and is adapted to be slid downwardly thereon in such a fashion as to close the lower intake aperture and force all the warm oil being admitted through the intake line means to travel through the entire upper intake into and through the upper intake aperture in such a fashion as to warm the handlebar construction all the way outwardly to the outermost end of the first arm.

A second tubing means preferably of rubber is removably locatable extending over and along the outer surface of the exit line means in such a fashion as to close the lower exit aperture. With this aperture closed all the warm oil being exited through the exit line means will be forced to travel through the upper exit aperture and thereby warm the handlebar construction outwardly all the way to the second arm end. This configuration is preferable during winter months when it is necessary to warm the entire length of the handlebar. During summer months the first tubing means and the second tubing means can be withdrawn from the oil chamber such that the oil can travel through the lower intake aperture and the lower exit aperture and thereby minimize heating which is not necessary during the summer months anyway. Access to placing and removal of the tubing means can be made by the detachable characteristics of the first and second stopper means.

The first stopper means may include a first annular flange being fixedly secured to the outer first arm end in such a manner as to define a first orifice extending therethrough into fluid flow communication with the first arm conduit. Also a first plug means may be included detachably securable extending through the first orifice to seal the first orifice. Securement between the outer surface of the plug means and the inner surface of the first orifice can be sealed by formation of mating male and female threads thereon.

Similarly the second stopper means may include a second annular flange fixedly secured to the outer second arm and defining a second orifice extending therethrough into fluid flow communication with the second arm conduit. The second stopper means may also include a second plug means detachably securable extending through the second orifice to seal the second orifice.

The second plug means may include a male thread on the outer portion thereof mated to a female thread configured on the inwardly extending surface of the second orifice in such a manner as to allow detachable securement therebetween.

The construction of the present invention may further include a grip means extending about the first arm means adjacent to the outer first arm end to facilitate grasping of the handlebars. Another similar grip means may be positioned around the second arm means adjacent to the outer second arm end to faciliate grasping of the handlebars.

In order to maintain the fixed position of the intake line and the exit line with respect to the center section a sealed securement means may be positioned such that these two lines are fixedly secured extending through the oil intake hole and the oil exit hole defined in the wall of the center section.

It is an object of the present invention to provide a means for the heating of handlebars of motorcycles.

It is an object of the present invention to provide a means for utilizing the normal waste heat in the oil of a motorcycle engine crank case to heat the handlebars of the vehicle during operation in cold environments.

It is an object of the present invention to provide a means for utilizing oil of a motorcycle engine for heating of the handlebars wherein the gripping portions of the handlebars will only be heated during operation in winter months but which is controllable to limit the heat traveling to the gripping sections thereof.

It is an object of the present invention to provide a means for the heating of motorcycle handlebars wherein access to the oil chamber defined inside of the handlebars is provided by stopper means being located in each opposite butt end of the handlebar gripping section.

It is an object of the present invention to provide a means for the heating of motorcycle handlebars wherein access to the intake and exit lines for the oil is provided by a three-section handlebar configuration including a central section and a first arm section extending outwardly from one end thereof and a second arm section extending outwardly from the other end thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a cross section and schematic illustrating the flow of oil through an embodiment of a handlebar construction of the present invention wherein the winter operating oil flow apertures are in ussage;

FIG. 2 is an exploded cross-sectional view of an embodiment of the second arm means of the present invention showing the tubing means in place over the exit conduit for operation during winter months;

FIG. 3 is an illustration of the embodiment shown in FIG. 1 wherein the tubing members are in place and wherein the oil is shown at the winter oil operating level; and FIG. 4 is a close-up illustrating the sealing means utilized at the ends of the embodiments of the first and second arm means.

DETAILED DESCRIPTION OF THE PREFERRED EMBODIMENT

The present invention provides a handlebar construction 10 which is adapted to be heated by the passage of oil through a conduit defined therein. After this heating the oil will be returned to an oil tank 12 where it will be supplied again to an oil pump 14 which will be pumped through the engine 16 to provide hot oil again to be passed through the handlebars for heating thereof. This heating is desirable during operation is colder climates. It is not necessary that the oil travel from the engine directly but this is a means for introducing the warmest oil into the handlebars.

The construction 10 preferably includes a generally horizontally extending central handlebar section 18 having a first end 20 and a second end 22. Each of these ends will preferably be press fit with respect to a first arm means 34 extending outwardly from the first end and a second arm means 40 extending outwardly from the second end 22.

The central section 18 preferably will include a central conduit 24 extending horizontally therethrough. The walls of this central section 18 will preferably define an oil intake hole 26 for the admitting of warm oil and an oil exit hole 28 for the expelling of oil after it has warmed the handlebars 10. The oil is carried from the engine 16 or other location of warm oil by an intake line means 30 which extends through the oil intake hole 26 into the central conduit 24 defined within the central section 18. After the oil has warmed the handlebars it passes into an exit line means 32 which extends through the oil exit hole 28 into the central handlebar section 18.

Oil admitted through the intake line means 30 is carried by this intake line means as it extends upwardly through a first arm conduit 36 defined within the first arm means 34. The intake line will extend all the way out almost completely to the outer first arm end 38 which is at the outermost end of the first arm means 34 away from the central handlebar section 18. In this manner the oil can be used to heat the entire length of the first arm means.

In a similar fashion a second arm conduit 42 extends along the length of the second arm means 40 and is in fluid flow communication with the central conduit 24. The exit line means 32 extends generally all the way to substantially the second arm end 44 to assure warming of the entire length of the second arm means also.

With this configuration the second arm conduit 42 in cooperation with the first arm conduit 36 and the central conduit 24 will define an oil chamber 46 adapted to receive warm oil therein for heating of the entire handlebar construction 10.

A first stopper means 48 is adapted to be positioned within the outermost end or outer first arm end 38 to effectively seal the first arm conduit 36 from the external environment. This first stopper means is selectively removable in order to also provide access to the oil chamber therein.

Preferably the first stopper means 48 will be configured including a first annular flange 50 such as a washer member or the like fixedly secured to the end of the first arm means. A first orifice 52 will be defined therein through which this access is provided. A first plug means 54 may be detachably secured within the first orifice 52. This securement may be provided by a mated male and female thread configuration on the inner portion of the first orifice 52 and the outer portion of the first plug means 54 or may be merely a wedging securement by a rubber first plug means 54 within a smooth first orifice 52. The threads 56 on the internal portion of the first orifice 52 would of course be necessarily mated with the external threads 58 on the first plug means 54.

A second stopper means 60 is adapted to be positioned within the outermost second arm end 44 to effectively seal the oil chamber from the external environment. Preferably the configuration of this second stopper means 60 would include a second annular flange 62 secured to the end of the first arm means and a second orifice 64 defined therein. A second plug means 66 is adapted to extend through the orifice to selectively seal the oil chamber from the external environment and also upon removal to provide access to the interior of the second arm conduit 42. The mating arrangement between the second plug means 66 and the second orifice 64 may include internal threads 68 defined on the internal portion of the second orifice and external threads 70 defined on the external surface of the second plug means 66 for cooperative interaction.

The intake line means 30 preferably defined as an upper intake aperture 72 positioned very near to the outermost end of the first arm means. Also a lower intake aperture 74 will be included at a location intermediate between the central section and the location of the upper intake aperture 72. In a similar fashion an upper exit aperture 76 is preferably defined by the exit line means 32 at a location near the outermost end of the second arm means 40. Also a lower exit aperture 78 is positioned in the exit line means 32 at an intermediate location between the upper exit aperture 76 and the central section of the handlebars 18.

A first tube means 80 may be included to be detachably secured over the outer wall of the intake line means 30 and to extend downwardly therealong in order to seal off the lower intake aperture 74. In a similar fashion a second tube means 82 which may also be of rubber or other similar material is adapted to extend over the exit line means 32 in such a fashion as to seal off the lower exit aperture 78 and prevent the flow of oil therethrough.

These first and second tube means 80 and 82 and selectively placed over the respective line means for sealing the lower apertures 74 and 78 thereof whenever operation during winter conditions is anticipated. That is with the tube means 80 and 82 in place oil will be caused to travel through the intake line means 30 all the way to the end of the first arm means 34 and thereby heat the gripping portion at the end thereof. In a similar fashion the oil will be forced to travel through the oil chamber 46 all the way to the end of the second arm means 40 in order to be picked up and admitted into the exit line means 32 through the upper exit aperture 76 since the lower exit aperture 78 is closed. This will effectively provide heating of the second arm means 40 all the way to the end thereof and provide warmth during winter operating conditions.

On the other hand, during summer operating conditions it is not necessary to heat the handlebars all the way to the ends since excessive heating in the area of the gripping sections is not desired. During these operating times the first tube means 80 and the second tube means 82 will be withdrawn. These may be withdrawn when access is provided thereto by removal of the first stopper means 48 and the second stopper means 60. Once the tubes are withdrawn the stopper means are replaced and the environment is sealed. With this configuration the oil will only reach the summer oil level 90 rather than the winter oil level 92 and shown in FIGS. 1 and 3, respectively. With the lower intake aperture 74 and the lower exit aperture 78 now open oil will pass out of the intake line means 30 and into the exit line means 32 at lower locations thereby minimizing the heating of the handlebar in the area adjacent to the portions normally gripped by a motorcycle operator. In this manner a simple means is provided for varying the heat traveling in the areas adjacent to the hands of the motorcycle operator.

To further control this heat transfer and to facilitate grasping of the handlebars a first grip means 84 and a second grip means 86 may be positioned about the first arm means 34 and the second arm means 40 at the outermost ends thereof.

To facilitate securement of the intake line means 30 and the exit line means 32 with respect to the central handlebar section 18 a sealed securement means 88 may be provided such as a welded section or the like to effectively secure these two lines with respect to the section as well as sealing the central conduit 24 to maintain sealed environment within the oil chamber 46.

In order to provide further access if necessary to the interior of the handlebar configuration of the present invention the first arm means 34 and the second arm means 40 may be detachably securable with respect to the central handlebar section 18 by a forced fit therebetween. These sections may be sealed by the first sealing means 94 and the second sealing means 96 such as an abutting wedging and cooperating sealing configuration therebetween.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An oil heated motorcycle handlebar construction comprising:
    (a) a central handlebar section extending generally horizontally and including a first end and a second end thereof and being adapted to be secured to a conventional motorcycle, said central handlebar section defining a central conduit therethrough and an oil intake hole and an oil exit hole therein;
    (b) a first arm means secured to and extending upwardly and outwardly from said first end of said central handlebar section and defining a first arm conduit therethrough being in fluid flow communication with said central conduit, said first arm means defining an outer first arm end opposite from securement to said central handlebar section;
    (c) a second arm means secured to and extending upwardly and outwardly from said second end of said central handlebar section and defining a second arm conduit therethrough being in fluid flow communication with respect to said central conduit, said second arm means defining an outer second arm end opposite from securement to said central handlebar section, said central conduit and said first arm conduit and said second arm conduit being in fluid flow communication to define an oil chamber for heating the motorcycle handlebars;

(d) a first stopper means detachably securable to said first arm end to seal said first arm conduit from fluid flow communication with respect to the external environment;

(e) a second stopper means detachably securable to said second arm end to seal said second arm conduit from fluid flow communication with respect to the external environment;

(f) an intake line means to admit warm oil into said oil chamber which extends through said oil intake hole into said central conduit and through said first end into said first arm conduit to a location adjacent to said outer first arm end and defining an upper intake aperture thereadjacent, said intake line means also defining a lower intake aperture within said first arm conduit at an intermediate location between said first end of said central section and said upper intake aperture;

(g) an exit line means to withdraw warm oil from said oil chamber which extends through said oil exit hole into said central conduit and through said second end into said second arm conduit to a location thereadjacent to said outer second arm end and defining an upper exit aperture thereadjacent, said exit line means also defining a lower exit aperture within said second arm conduit at an intermediate location between said second end of said central section and said upper exit aperture;

(h) a first tubing means removably placeable extending over and along the outer surface of said intake line means to close said lower intake aperture and force all warm oil being admitted through said intake line means to travel through said upper intake aperture and warm the handlebar construction outwardly to said first arm end; and (i) a second tubing means removably placeable extending over and along the outer surface of said exit line means to close said lower exit aperture and force all warm oil being exited through said exit line means to travel through said upper exit aperture and warm the handlebar construction outwardly to said second arm end.

2. The construction as defined in claim 1 wherein said first stopper means comprises:

(a) a first annular flange fixedly secured to said outer first arm end and defining a second orifice extending therethrough into fluid flow communication with said first arm conduit; and (b) a first plug means detachably securable extending through said first orifice to seal said first orifice.

3. The construction as defined in claim 2 wherein said first orifice is internally threaded and wherein said first plug means is matedly externally threaded to effectively seal said first orifice.

4. The construction as defined in claim 1 wherein said second stopper means comprises:

(a) a second annular flange fixedly secured to said outer second arm end and defining a second orifice extending therethrough into fluid flow communication with said second arm conduit; and (b) a second plug means detachably securable extending through said second orifice to seal said second orifice.

5. The construction as defined in claim 4 wherein said second orifice is internally threaded and wherein said second plug means is matedly externally threaded to effectively seal said second orifice.

6. The construction as defined in claim 1 further comprising a first grip means extending around said first arm means adjacent to said outer first arm end to facilitate grasping of the handlebars.

7. The construction as defined in claim 1 further comprising a second grip means extending around said second arm means adjacent to said outer second arm end to facilitate grasping of the handlebars.

8. The construction as defined in claim 1 wherein said first and second tubing means are rubber tubing sections.

9. The construction as defined in claim 1 further comprising a sealed securement means to fixedly secure said intake line means and said exit line means as they extend through said oil intake hole and said oil exit hold and to seal said oil chamber.

10. An oil heated motorcycle handlebar construction comprising:

(a) a central handlebar section extending generally horizontally and including a first end and a second end thereof and being adapted to be secured to a conventional motorcycle, said central handlebar section defining a central conduit therethrough and an oil intake hole and an oil exit hole therein;

(b) a first arm means secured to and extending upwardly and outwardly from said first end of said central handlebar section and defining a first arm conduit therethrough being in fluid flow communication with said central conduit, said first arm means defining an outer first arm end opposite from securement to said central handlebar section;

(c) a second arm means secured to and extending upwardly and outwardly from said second end of said central handlebar section and defining a second arm conduit therethrough being in fluid flow communication with respect to said central conduit, said second arm means defining an outer second arm end opposite from securement to said central handlebar section, said central conduit and said first arm conduit and said second arm conduit being in fluid flow communication to define an oil chamber for heating the motorcycle handlebars;

(d) a first stopper means detachably securable to said first arm end to seal said first arm conduit from fluid flow communication with respect to the external environment, said first stopper means further comprising a first annular flange fixedly secured to said outer first arm end and defining an internally threaded first orifice extending therethrough into fluid flow communication with said first arm conduit, said first stopper means also including a first plug means externally threaded to match the internal threading of said first orifice and detachably securable extending through said first orifice to seal said first orifice;

(e) a second stopper means detachably securable to said second arm end to seal said second arm conduit from fluid flow communication with respect to the external environment, said second stopper means further comprising a second annular flange fixedly secured to said outer second arm end and defining a second orifice being internally threaded and extending therethrough into fluid flow communication with said second arm conduit, said second stopper means further including a second plug means being externally threaded to match the internal threads on said second orifice and being detachably securable extending through said second orifice to seal said second orifice;

(f) an intake line means to admit warm oil into said oil chamber which extends through said oil intake hole into said central conduit and through said first end into said first arm conduit to a location adjacent to said outer first arm end and defining an upper intake aperture thereadjacent, said intake line means also defining a lower intake aperture within said first arm conduit at an intermediate location between said first end of said central section and said upper intake aperture;

(g) an exit line means to withdraw warm oil from said oil chamber which extends through said oil exit hole into said central conduit and through said second end into said second arm conduit to a location thereadjacent to said outer second arm end and defining an upper exit aperture thereadjacent, said exit line means also defining a lower exit aperture within said second arm conduit at an intermediate location between said second end of said central section and said upper exit aperture;

(h) a first rubber tubing means removably placeable extending over and along the outer surface of said intake line means to close said lower intake aperture and force all warm oil being admitted through said intake line means to travel through said upper intake aperture and warm the handlebar construction outwardly to said first arm end;

(i) a second rubber tubing means removably placeable extending over and along the outer surface of said exit line means to close said lower exit aperture and force all warm oil being exited through said exit line means to travel through said upper exit aperture and warm the handlebar construction outwardly to said second arm end;

(j) a first grip means extending around said first arm means adjacent to said outer first arm end to facilitate grasping of the handlebars;

(k) a second grip means extending around said second arm means adjacent to said outer second arm end to facilitate grasping of the handlebars; and (l) a sealed securement means to fixedly secure said intake line means and said exit line means as they extend through said oil intake hole and said oil exit hole and to seal said oil chamber.

* * * * *